No. 708,454. Patented Sept. 2, 1902.
C. S. BIRD & J. B. HANSCOM.
METHOD OF WATERPROOFING PAPER.
(Application filed Oct. 22, 1901.)
(No Model.) 2 Sheets—Sheet 1.
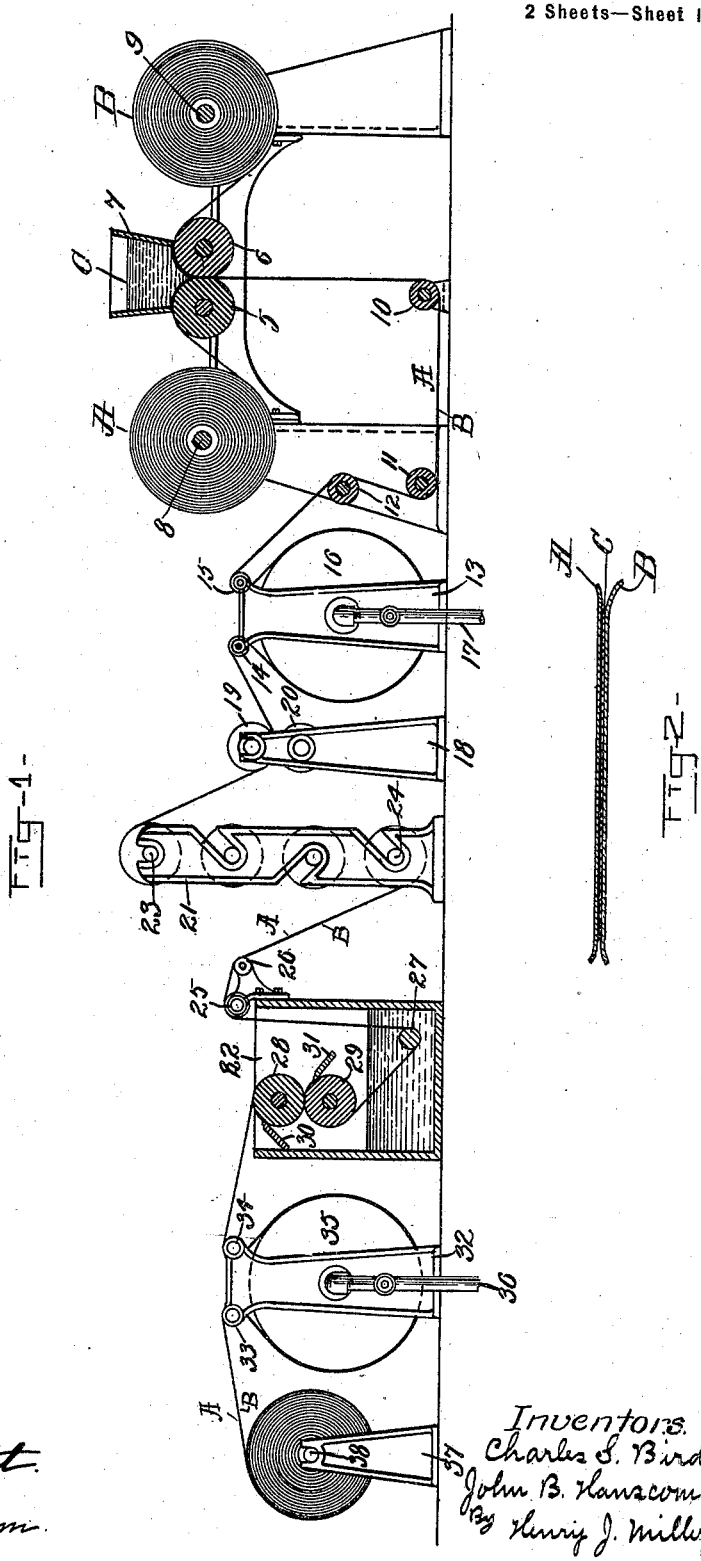
Witnesses.
Harry C. Gilbert
Wm. H. Varnum
Inventors.
Charles S. Bird
John B. Hanscom
By Henry J. Miller atty.

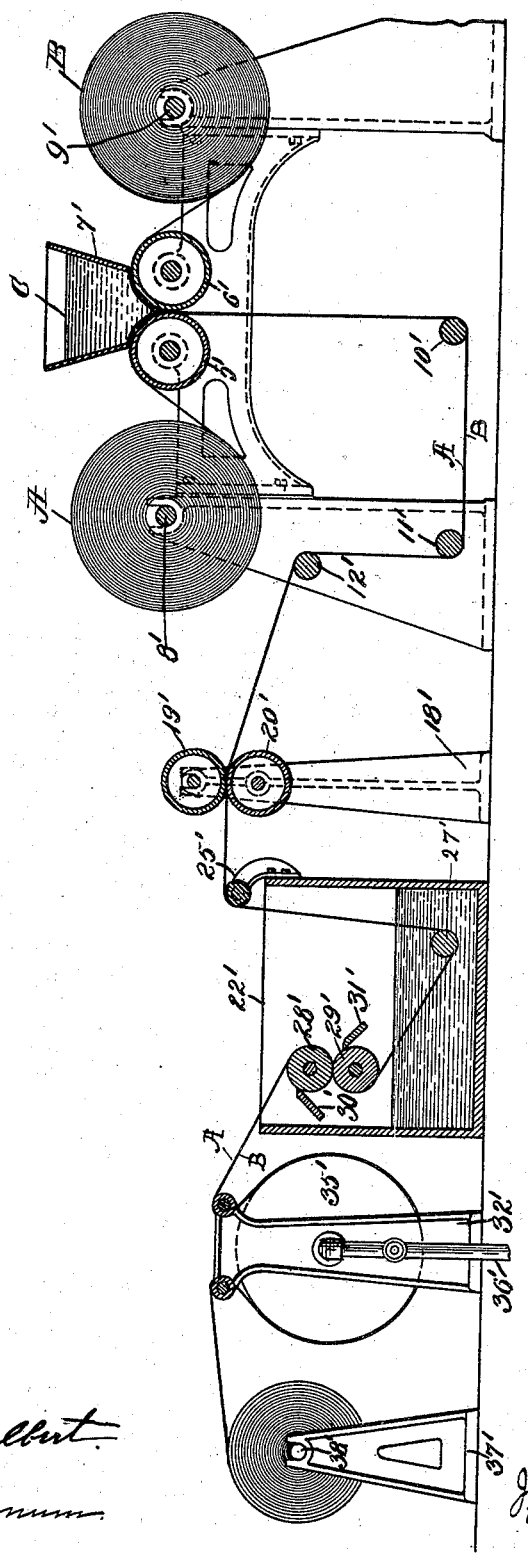

UNITED STATES PATENT OFFICE.

CHARLES S. BIRD AND JOHN B. HANSCOM, OF EAST WALPOLE, MASSACHUSETTS, ASSIGNORS TO F. W. BIRD AND SON, A FIRM COMPOSED OF CHARLES S. BIRD, OF EAST WALPOLE, MASSACHUSETTS.

METHOD OF WATERPROOFING PAPER.

SPECIFICATION forming part of Letters Patent No. 708,454, dated September 2, 1902.

Application filed October 22, 1901. Serial No. 79,531. (No specimens.)

*To all whom it may concern:*

Be it known that we, CHARLES S. BIRD and JOHN B. HANSCOM, citizens of the United States, residing at East Walpole, in the county of Norfolk and State of Massachusetts, have invented certain new and useful Improvements in Methods of Waterproofing Paper, of which the following is a specification, reference being had therein to the accompanying drawings.

This invention has reference to improvements in a method for waterproofing paper.

One object of the invention is to so manufacture waterproof paper comprising a plurality of layers that wrinkling of the paper in its winding up and the resultant loss therefrom may be prevented.

Another object of the invention is to thoroughly set the intermediate layer of waterproof material prior to the subjection of the paper layers to a waterproofing-bath.

The invention consists in combining a plurality of layers of paper or other suitable material with an intermediate layer of waterproofing material, cooling the resultant product, compressing the same, subjecting the surfaces to fluid waterproofing material, and finally cooling and winding the product.

The invention also consists in combining two layers of paper with an intermediate layer of heated waterproof material, compressing the compound sheet thus formed, and finally cooling and winding the same.

The invention also consists in such other novel steps in the process of waterproofing paper as shall hereinafter be more fully described, and pointed out in the claim.

Figure 1 represents a side elevation, partially in section, of a machine by which this method may be carried into effect. Fig. 2 represents, in enlarged scale, a sectional view of the compound sheet or web, the ends of the paper layers being turned away to more clearly indicate their individuality. Fig. 3 represents a side elevation, partially in section, of a modified construction of the machine, whereby the process may be continuous.

Similar numbers of reference designate corresponding parts throughout.

In carrying this invention into practice we make use of an organized machine comprising a pair of rolls 5 and 6, rotatably mounted in any suitable frame and adapted to be driven in opposite directions. Above these rolls is mounted any usual form of bottomless hopper, as 7, the ends of which extend down between the rolls 5 and 6, but do not contact with the peripheries of such rolls. Preferably adjacent to such rolls 5 and 6 are supports for the spindles 8 and 9, on which rolls A and B of paper may be carried, these spindles being also driven in opposite directions, if desired. Directly below the rolls 5 and 6 is rotatably mounted the guide-roll 10, and other rotatable guide-rolls 11 and 12 are provided in the machine. Beyond the guide-roll 12 is a pair of standards, as 13, carrying at their upper ends rotatable guides 14 and 15, and in these standards is journaled the cooling-cylinder 16, having a smooth periphery and being driven in any ordinary manner. This cylinder 16 is hollow, and its ends within the journaled portions are perforated to receive the inturned ends of the water-supply pipe 17 and of a corresponding outlet-pipe, whereby a constant flow of water can be maintained through the cylinder. Adjacent to the cylinder 16 is located a pair of brackets, as 18, in which the squeeze-rolls 19 and 20 are journaled, the roll 19 bearing on the roll 20 and these rolls being provided with any usual form of driving mechanism. The rack 21 is located between the squeeze-rolls 19 and 20 and the waterproofing-tank 22. This rack may be of any ordinary construction to receive a series of rotatable spindles or shafts, as 23 and 24, which are or may be connected with driving mechanism. This tank 22 is designed to contain waterproofing compound, either fluid under normal temperature or when heated. On the tank are mounted guides, as 25 and 26, or their equivalents, and within the tank is the guide-roll 27 and the squeeze-rolls 28 and 29, each provided with a wiper 30 or 31, extending the full length of said rolls. Beyond the tank 22 is mounted standards, as 32, carrying the guides 33 and 34 at their upper ends, and in these standards is journaled the hollow cylinder 35, having hollow journaled portions through which extend inwardly-turned ends of pipes, as 36, through which a constant supply of water may be maintained to the interior of the cylinder and the heated water may be drawn off. At any suitable distance from the standards 32 is located a frame, as 37, in which the receiving-spindle 38 is journaled and driven, this spindle being adapted to receive and wind the finished product.

In the modification shown in Fig. 3 of the drawings the structure of the machine is similar to that shown in Fig. 1, except that the cooling-cylinder 16 and its framework and the rack 21 and its spindles 23 24 are omitted and the web is led directly from the squeeze-rolls 19' 20' to the tank 22' over the guide-roll 25'.

The ends of the webs A and B of paper or other fibrous or textile material being brought through between the rolls 5 and 6, waterproofing material is placed on said webs within the bottomless hopper 7, and as the two webs of paper pass down between these rolls a portion of this material is carried along between the webs, the thickness of this layer C being determined by the fluidity thereof and by the compression exerted by the rolls 5 and 6. This intermediate layer C is generally of pitch or material in which pitch predominates or some asphaltic substitute for pitch and is generally supplied to the hopper 7 in a heated condition and in comparatively small quantities. It is therefore evident that a hopper of much smaller dimensions than that shown in the drawings would preferably be used. The compound fabric after passing from between the rolls 5 and 6 (designated as A B) is led under the guide-rolls 10 and 11 and over those marked 12 and 15 to and around the cooling-cylinder 16 to reduce the temperature of the fabric. It is then led over the guide 14 to and between the squeeze-rolls 19 and 20, the compression of the roll 19 tending to further set the intermediate layer of waterproofing compound C, the fabric then being wound on one of the spindles, as 23 or 24, journaled in the rack 21. When one of the spindles, as 23 or 24, has received a sufficient quantity of the compound fabric, the further supply of the fabric reaching the rack 21 is directed to another of said spindles, and the end of the fabric from the filled spindle is led over the guides 26 and 25 into the tank 22, under the guide 27 therein, and then between the rolls 28 and 29 of said tank, this tank 22 being supplied with a waterproofing compound sufficiently fluid to be absorbed by the outer layers of the fabric and the surplus of such compound being pressed from the fabric as it passes between the rolls 28 and 29. From the roll 28 the fabric passes over the guide 34 to and around the cooling-cylinder 35 and then over the guide 33 to the spindle 38, where it is wound into a roll for future use.

In the modification shown in Fig. 3 of the drawings the intermediate layer is supplied between the webs A and B, as in the process shown in Fig. 1. The compound fabric is then led under the guides 10' and 11' and over that marked 12' to and between the rolls 19' and 20' to tend to set the substance of the intermediate layer C and to fix the webs A and B together thereby without reducing the temperature of the fabric. This fabric thus passes into the tank 22' at a temperature slightly above the normal, whereby the waterproofing compound in said tank is the more readily absorbed by the outer layers of the fabric. After passing under the guide 27' of the tank and between the rolls 28' and 29' for the removal of the surplus waterproofing material the fabric is led to and around the cooling-cylinder 35', and thence to the spindle 38' to be wound into a roll.

It is evident that the waterproofing compound or material contained in the tank 22 or 22' may be of any usual nature and may be applied in a heated condition or at the temperature of the atmosphere, as shall appear most desirable for its application, either by absorption into the pores of the material A B or as coating for the exposed surfaces thereof.

By the use of this improved process it is found that the layers A and B are intimately and permanently united, so that no blisters therein are caused in the final winding or use of the fabric, while the final cooling and, in a degree, ironing by subjection to the surface of the cylinder 35 or 35' prevents the creeping of the compound fabric as it is wound on the spindle 38 or 38', thus preventing the forming of wrinkles in the fabric and the consequent deterioration of its waterproof qualities by cracking under the pressure of the added convolutions of the fabric wound thereon.

Having thus described our invention, we claim as new and desire to secure by Letters Patent—

The process in the art of manufacturing waterproof paper fabric which consists in feeding two sheets, or webs, of paper between compressing means, simultaneously feeding waterproofing material therebetween, cooling and compressing the compound fabric, subjecting the surfaces of the compound fabric to fluid waterproofing material, and cooling the fabric.

In testimony whereof we affix our signatures in presence of two witnesses.

CHARLES S. BIRD.
JOHN B. HANSCOM.

Witnesses:
HENRI E. DAVENPORT,
W. R. MCNEIL.